United States Patent [19]
Peluso

[11] Patent Number: 5,940,225
[45] Date of Patent: Aug. 17, 1999

[54] MAGNIFYING GLASS WITH ATTACHED SCREWDRIVER TOOL

[76] Inventor: Herbert Peluso, 2901 Beverwil Dr., Los Angeles, Calif. 90034

[21] Appl. No.: 09/064,564

[22] Filed: Apr. 22, 1998

[51] Int. Cl.$^6$ ........................................................ G02B 3/00
[52] U.S. Cl. ............................................ 359/810; 359/809
[58] Field of Search ..................................... 359/810, 809, 359/808, 805, 802, 803, 801; 81/3.5, 184, 490; 7/165, 170

[56] References Cited

U.S. PATENT DOCUMENTS

| | | | |
|---|---|---|---|
| 2,732,761 | 1/1956 | Bender et al. | 359/810 |
| 3,011,258 | 12/1961 | Kotchan | 30/367 |
| 5,150,261 | 9/1992 | Tsai | 359/810 |

*Primary Examiner*—Hung Dang
*Attorney, Agent, or Firm*—Goldstein & Canino

[57] ABSTRACT

A magnifying lens and screwdriver tool, comprising a handle having a proximal end and a distal end. A magnifying lens, having an optical field, is attached to the distal end of the handle. A bridge extends from the handle, the bridge having a sleeve and a connecting member extending between the handle and the sleeve. A screwdriver having a screwdriver tip extends through the sleeve, wherein the sleeve supports the screwdriver for rotational movement therein and holds the screwdriver tip within the optical field of the magnifying lens. The handle is grasped in the hand, the handle extending between the thumb and forefinger, resting upon the webbed hollow therebetween and against the palm. The thumb and forefinger of the same hand grasp the screwdriver, so that the screwdriver tip can engage a workpiece and turn a screw thereat, while the workpiece, screw, and screwdriver tip are viewed through the magnifying lens.

9 Claims, 3 Drawing Sheets

MAGNIFYING GLASS WITH ATTACHED SCREWDRIVER TOOL

BACKGROUND OF THE INVENTION

The invention relates to a magnifying glass with an attached screwdriver tool. More particularly, the invention relates to a magnifying glass which supports a screwdriver, and maintains the tip in the optical field of the magnifying glass.

As manufacturing techniques improve, electronic miniaturization progresses, and material strengths increase, more and more everyday items are assembled using miniature screws. Eyeglasses are perhaps one of the most popular products which feature these miniature screws. Typically, each earpiece is held to the frame with a miniature screw. This screw often loosens, and eventually falls out, requiring replacement.

Thankfully, what were once called "jewler's screwdrivers" are now present in almost every household. Unfortunately, although we might have the tools for the repairing task, we cannot always see the workpiece well enough to perform the needed operation. Ironically, when working on a pair of eyeglasses, the workpiece is the very item which would help one better see the task that must be performed. To further compound the difficulty of performing this task, it is quite obvious that the very people that need eyeglasses tend to have the worst vision, and thus have the most difficulty fixing their eyeglasses.

To aid in performing this task, one might attempt to use a magnifying lens to view the workpiece. However, the magnifying lens requires one hand to hold it. The screwdriver requires another hand. Thus, unless a vise is handy to hold the workpiece, it is not usually possible to use a magnifying glass along with the screwdriver.

U.S. Pat. No. 5,150,261 to Tsai discloses a combined screwdriver and magnifying glass. The magnifying lens in Tsai is coaxial with the screwdriver. Thus, to effectively see through the manifying glass, one would have to align their eye directly beyind the handle of the screwdriver—obscuring the view of the workpiece. Further, it does not seem clear that that the device of Tsai is optically feasible.

While these units may be suitable for the particular purpose employed, or for general use, they would not be as suitable for the purposes of the present invention as disclosed hereafter.

SUMMARY OF THE INVENTION

It is an object of the invention to produce a magnifying glass with a screwdriver tool which makes it easier to engage and turn a miniature screw. Accordingly, the tip of the screwdriver is maintained in the optical field of the magnifying glass.

It is another object of the invention to produce a magnifying glass with a screwdriver tool which allows one handed operation of both the magnifying glass and the screwdriver. Accordingly, the handle of the magnifying glass has a bridge which supports the magnifying glass for rotation within the bridge. The handle may be easily securely grasped with one hand, while the thumb and forefinger of the same hand is capable of operating the screwdriver.

It is a further object of the invention to produce a magnifying glass with a screwdriver which easily adjusts to different workpieces. Accordingly, the handle may comprise several pivotable segments, which allow adjustment of the relative magnifying angle. Further, the bridge may be angularly adjusted with respect to the handle.

It is a still further object of the invention that the tool is simple in construction, so that it is inexpensive to manufacture.

The invention is a magnifying lens and screwdriver tool, comprising a handle having a proximal end and a distal end. A magnifying lens, having an optical field, is attached to the distal end of the handle. A bridge extends from the handle, the bridge having a sleeve and a connecting member extending between the handle and the sleeve. A screwdriver having a screwdriver tip extends through the sleeve, wherein the sleeve supports the screwdriver for rotational movement therein and holds the screwdriver tip within the optical field of the magnifying lens. The handle is grasped in the hand, the handle extending between the thumb and forefinger, resting upon the webbed hollow therebetween and against the palm. The thumb and forefinger of the same hand grasp the screwdriver, so that the screwdriver tip can engage a workpiece and turn a screw thereat, while the workpiece, screw, and screwdriver tip are viewed through the magnifying lens.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
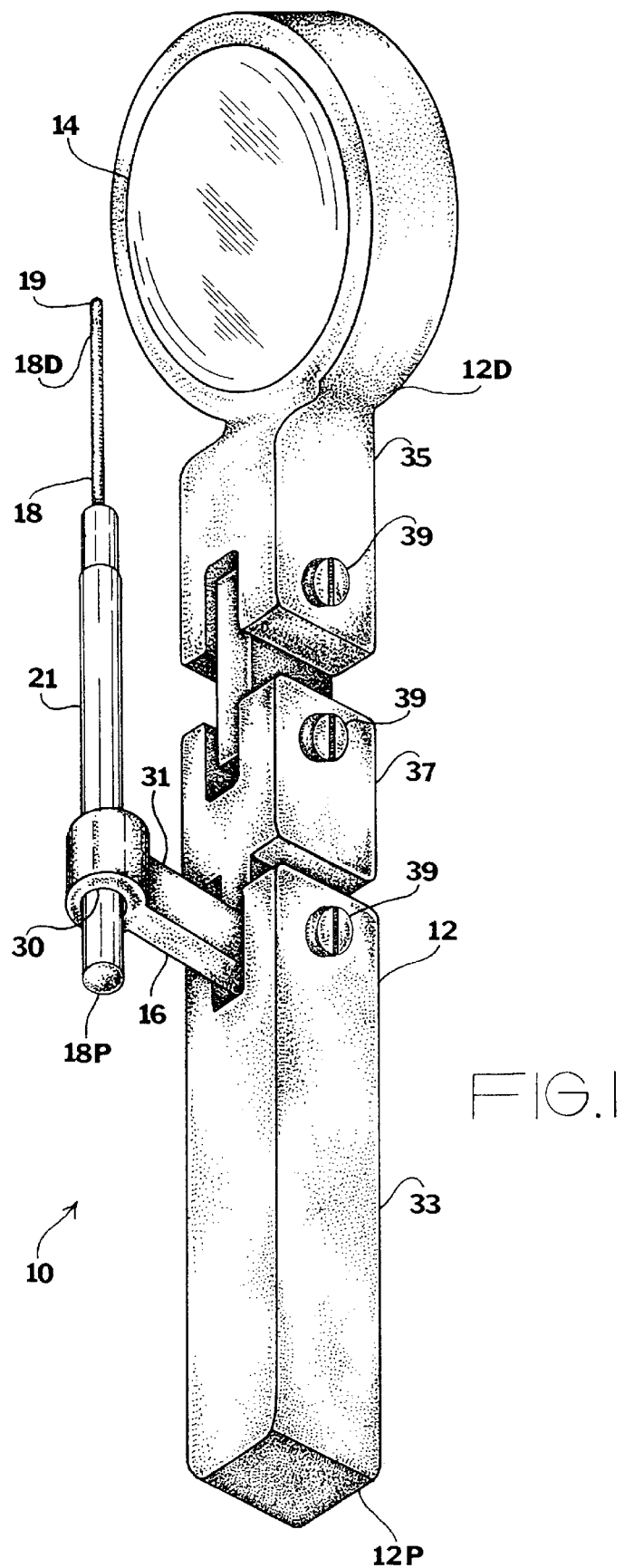
FIG. 1 is a diagrammatic perspective view, illustrating the invention, per se.

FIG. 1 illustrates a magnifying glass with screwdriver tool 10, comprising a handle 12 having a proximal end 12P and a distal end 12D. A magnifying lens 14 is located at the distal end 12D. A bridge 16 extends from the handle 12. A screwdriver 18 is supported by the bridge 16, such that the screwdriver extends substantially alongside the handle 12.

The bridge 16 comprises a sleeve 30 and a connecting member 31. The screwdriver 18 extends through the sleeve 30, and the connecting member 31 extends between the sleeve 30 and the handle 12. As illustrated, the connecting member 31 is substantially perpendicular to the handle 12, and the screwdriver 18 extends substantially parallel to the handle 12. However, the connecting member 31 can vary its angle with respect to the handle 12 to an extent which still ensures that the screwdriver 18 extends substantially along the handle 12.

The screwdriver 18 has a proximal end 18P and a distal end 18D. The screwdriver 18 has a screwdriver tip 19 at the distal end 18D which is configured for operative engagement with the intended workpiece. Thus, the screwdriver tip 19 may have a "flat-head" configuration, "Phillips-head" configuration, etc. The screwdriver 18 has a handgrip 21 which extends from the proximal end 18P of the screwdriver 18. The handgrip 21 is sized to fit within the sleeve 30 so that it is held firmly therein, but is capable of easy rotation therein. The handgrip 21 is also capable of sliding proximally and distally within the sleeve 30, to position the screwdriver tip 19 for optimal use. However, this sliding motion can be limited by adding a pair of flanges to the handgrip 21 proximally and distally of the sleeve 30. The flanges would thus define a range of slidable motion for the screwdriver 18 within the sleeve 30.

Figure 2:
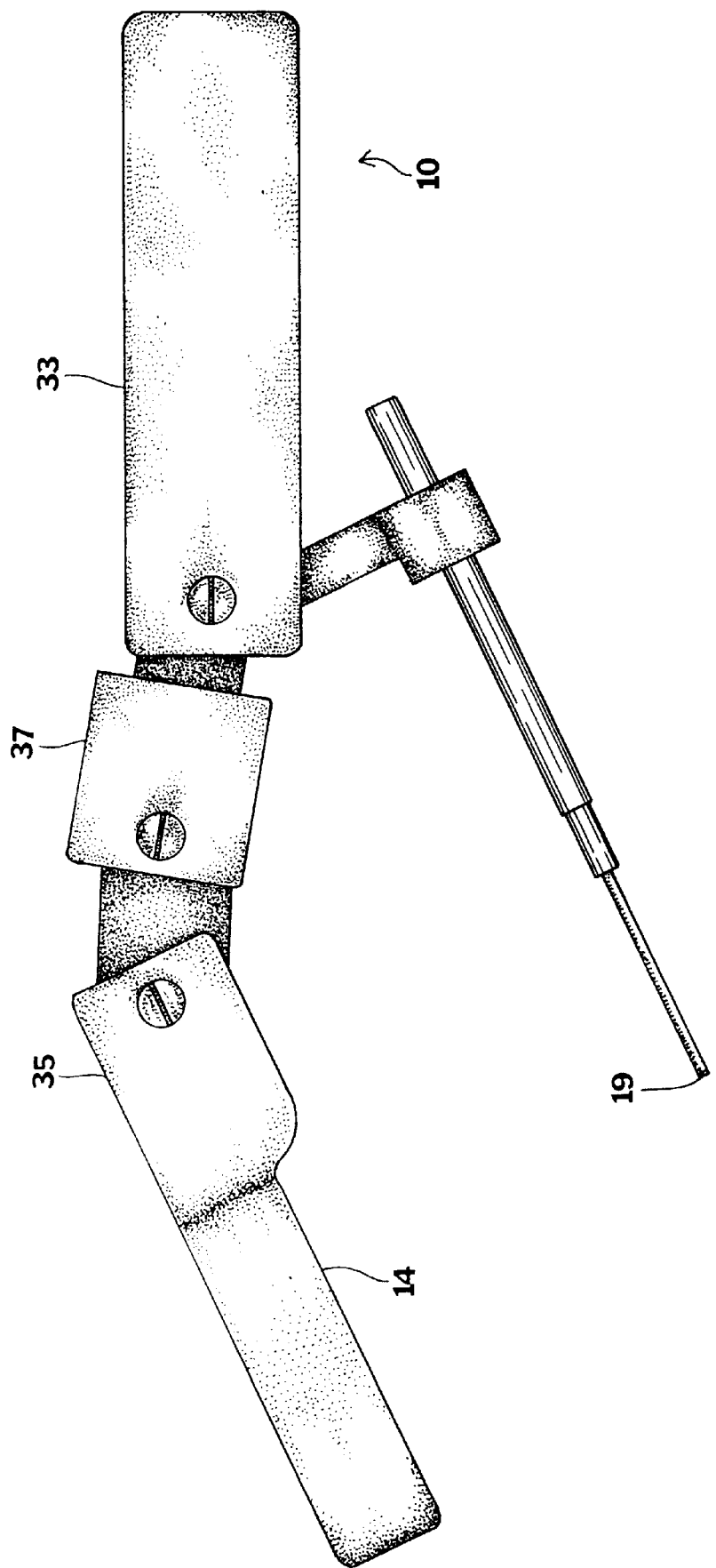
FIG. 2 is a side elevational view, illustrating the invention, wherein the handle segments have been adjusted prior to using the invention.

The handle 12 itself comprises several segments, including a butt portion 33, a lens end 35 which is rigidly attached to the magnifying lens 14, and one or more mid sections 37 between the butt portion 33 and lens end 35. The butt portion 33, lens end 35, and mid section 37 are all attached with hinge pins 39. The hinge pins 39 are slotted to allow selective loosening and tightening of the hinge pins 39 to selectively allow easy adjustment of relative angles of the segments, and then to selectively maintain the relative angle of the segments. In FIG. 1, the butt portion 33, lens end 35, and mid section 37 is substantially planar. However, in FIG. 2, the relative angles of the butt portion 33, lens end 35 and mid section 37 have been adjusted just prior to using the tool 10. Important to the present invention, the magnifying lens 14 has an optical field which is the area that is clearly viewable by the user through the magnifying lens 14. Accordingly, the relative angles of the handle segments are adjusted so that the screwdriver tip 19 is maintained within the optical field of the magnifying lens 14.

Figure 3:
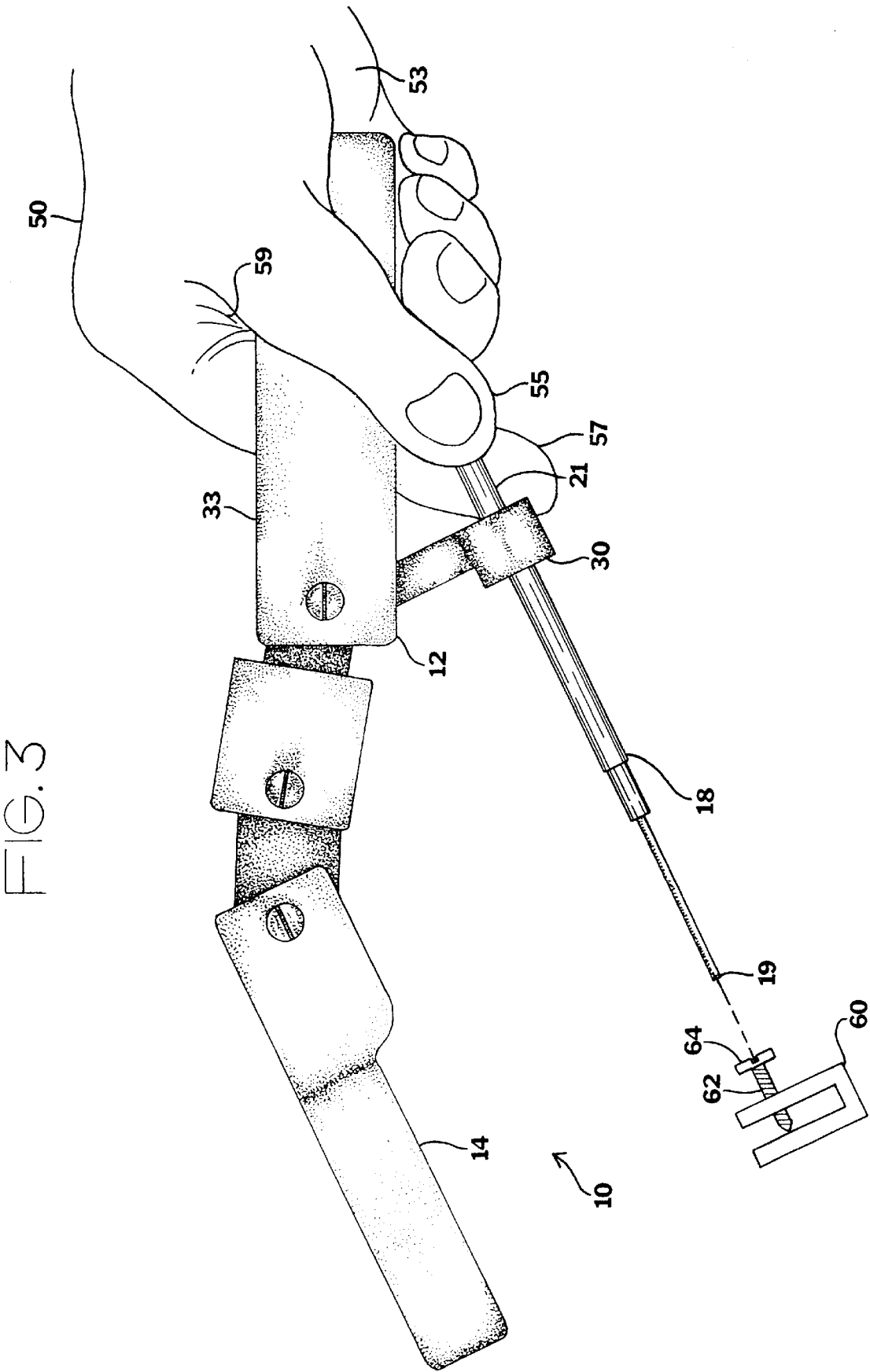
FIG. 3 is a side elevational view of the invention in use, wherein the handle is held within a hand, and wherein the screwdriver is about to engage a workpiece. The workpiece has been greatly enlarged for clarity.

Referring to FIG. 3, the tool 10 is being grapsed by a hand 50. The hand 50 has a palm 53, a thumb 55, a forefinger 57, and a webbed hollow 59 between the thumb 55 and forefinger. The tool 10 is supported by the hand 50, wherein the butt portion 33 of the handle 12 is extending between the thumb 55 and forefinger 57 in the webbed hollow 59, and is resting against the palm 53. The thumb 55 and forefinger 57 extend around the handle, and grasp the handgrip 21 of the screwdriver 18, proximally of the sleeve 30.

As seen in FIG. 3, the tip 19 of the screwdriver 18 is about to engage a workpiece 60. The workpiece 60 has been greatly enlarged in FIG. 3 for clarity.

The workpiece 60 has a screw 62 having a slotted head 64. The workpiece 60 is well within the optical field of the magnifying lens 14. To engage the workpiece 60, the entire tool 10 may be moved toward the workpiece 60, or the screwdriver 18 may be slid distally within the sleeve 30 until the tip 19 engages the slotted head 64 of the screw 62. Once thus engaged, the screw 62 may be turned with the screwdriver, by rotating the handgrip 21 of the screwdriver 18 between the thumb 55 and forefinger 57 of hand 50, while the workpiece remains in full view through the magnifying lens 14.

In conclusion, herein is presented a magnifying lens with a screwdriver, having a handle to which the magnifying lens is attached. The handle supports the screwdriver with a bridge which maintains the screwdriver tip in the magnifying lens optical field. Thus, the user is able to hold the magnifying glass in their hand, while operating the screwdriver on a workpiece with the same hand.

What is claimed is:

1. A magnifying lens and screwdriver tool, comprising:
a handle having a proximal end and a distal end;
a magnifying lens attached to the distal end of the handle, the magnifying lens having an optical field;
a bridge extending from the handle; and
a screwdriver having a screwdriver tip, the screwdriver supported by the bridge so that screwdriver tip is within the optical field of the magnifying lens.

2. The magnifying lens and screwdriver tool as recited in claim 1, wherein the bridge further comprises a sleeve and a connecting member attaching the sleeve to the handle, the screwdriver has a handgrip that extends through the sleeve, the screwdriver extending substantially alongside the handle.

3. The magnifying lens and screwdriver tool as recited in claim 2, wherein the handle further comprises segments which are pivotally adjustable with respect to each other.

4. The magnifying lens and screwdriver tool as recited in claim 3, wherein the segments comprise a butt portion and a lens end, the butt portion at the proximal end of the handle, the lens end at the distal end of the handle, the lens end rigidly supporting the magnifying lens.

5. The magnifying lens and screwdriver tool as recited in claim 4, wherein the segments further comprise a mid section which is pivotally connected between the butt portion and the lens end.

6. The magnifying lens and screwdriver tool as recited in claim 5, wherein the segments are attached with hinge pins, and wherein the connecting member is pivotally connected to the handle so that the screwdriver may be angularly adjusted with respect to the handle while still maintaining the tip of the screwdriver within the optical field.

7. A magnifying lens and screwdriver method, using a tool having a handle, a magnifying lens attached to the handle and having an optical field, a bridge extending from the handle, and a screwdriver having a screwdriver tip, the screwdriver supported by the bridge for rotable movement therein such that the tip is maintained within the optical field of the magnifying glass, for performing work upon a workpiece with a hand, comprising the steps of:
grasping the handle in the hand while grasping the screwdriver with the same hand;
viewing the screwdriver tip through the magnifying lens;
engaging the screwdriver tip with the workpiece; and
turning the screwdriver with the hand while continuing to view the workpiece through the magnifying lens.

8. The magnifying lens and screwdriver method as recited in claim 7, wherein the hand has a palm, a thumb, a forefinger, and a webbed hollow between the thumb and forefinger, and wherein the step of grasping the handle while grasping the screwdriver further comprises:
extending the handle between the thumb and forefinger against the webbed hollow; and
grasping the screwdriver between the thumb and forefinger.

9. The magnifying lens and screwdriver method as recited in claim 8, wherein the handle comprises segments which are pivotally attached to each other, and further comprising the step of angularly adjusting the segments with respect to each other to postion the screwdriver toward the workpiece for an optimal viewing angle.

* * * * *